United States Patent [19]

Hesse et al.

[11] Patent Number: 4,481,311
[45] Date of Patent: Nov. 6, 1984

[54] BINDERS BASED ON CO-CONDENSATES OF EPOXY RESINS AND RESOLS WITH AMINES A PROCESS FOR THEIR PREPARATION AND FOR ELECTROPHORETIC DEPOSITION, AND AN ELECTROPHORESIS BATH

[75] Inventors: Wolfgang Hesse, Wiesbaden; Jürgen Ritz, Mainz; Rolf Zimmermann, Wiesbaden, all of Fed. Rep. of Germany

[73] Assignee: Hoechst Aktiengesellschaft, Fed. Rep. of Germany

[21] Appl. No.: 413,473

[22] Filed: Aug. 31, 1982

[30] Foreign Application Priority Data

Sep. 4, 1981 [DE] Fed. Rep. of Germany ....... 3135010

[51] Int. Cl.³ .................. C08L 61/06; C08L 61/10; C08L 62/00
[52] U.S. Cl. .................. 523/424; 525/481; 525/486; 525/523; 528/104
[58] Field of Search .......... 525/481, 486, 523; 528/104; 523/424

[56] References Cited

U.S. PATENT DOCUMENTS

| Re. 27,426 | 7/1972 | Lincoln et al. | 525/486 |
|---|---|---|---|
| T916,002 | 11/1973 | Lannikitis et al. | 525/486 |
| 3,567,668 | 3/1971 | Güldenpfennig | 523/424 |
| 3,650,996 | 3/1972 | Güldenpfennig | 523/424 |
| 3,663,354 | 5/1972 | Ueno et al. | 525/481 |
| 3,720,648 | 3/1973 | Güldenpfennig | 523/424 |
| 3,726,276 | 5/1973 | Crowne et al. | 523/424 |
| 3,840,483 | 10/1974 | Güldenpfennig | 523/424 |
| 3,937,679 | 2/1976 | Bosco et al. | 523/424 |
| 4,130,531 | 12/1978 | Purcell | 525/486 |
| 4,246,162 | 1/1981 | Schreiber | 525/481 |

FOREIGN PATENT DOCUMENTS

| 129563 | 1/1978 | German Democratic Rep. | 525/481 |
|---|---|---|---|
| 54-139942 | 10/1979 | Japan | 525/481 |
| 1146694 | 3/1969 | United Kingdom | 525/481 |

Primary Examiner—Allan M. Lieberman
Attorney, Agent, or Firm—Charles A. Muserlian

[57] ABSTRACT

Binders based on co-condensates of epoxy resins and resols with amines, the epoxy resin being partially defunctionalized and still containing on average 0.5–1.3 epoxide groups per molecular unit, the resol component being composed of methylol compounds of oligomethylene compounds, which are additionally substituted by hydrocarbon or hydroxyalkyl or hydroxyaralkyl radicals, and the amine containing at least one primary or secondary amino group and at most 2 hydroxyl groups.

The invention further relates to a process for the preparation of a binder and for the electrophoretic deposition of a cationic resin from an aqueous dispersion onto an article connected as the cathode and to an aqueous electrophoresis bath for carrying out this process.

13 Claims, No Drawings

BINDERS BASED ON CO-CONDENSATES OF EPOXY RESINS AND RESOLS WITH AMINES A PROCESS FOR THEIR PREPARATION AND FOR ELECTROPHORETIC DEPOSITION, AND AN ELECTROPHORESIS BATH

For the preparation of binders which can be cathodically deposited, acids are added to amine-functional synthetic resins. By this means, they become water-soluble and can be deposited by direct current. The precondensation of adducts of polyisocyanates onto a combination of polyhydroxy compounds and amines, as the amine-functional component, with resols has been disclosed (German Offenlegungsschrift Nos. 3,005,735 and 2,755,538). For several reasons, which relate to the toxicity, the high price and the susceptibility to hydrolysis of these resins or their raw materials, it has been proposed in the literature to use amine-adducts of epoxy resins together with resols instead of the isocyanate/-polyhydroxy resins (German Offenlegungsschrift No. 2,737,375, U.S. Pat. No. 3,729,435, German Offenlegungsschrift No. 2,620,612, U.S. Pat. No. 4,172,062, U.S. Pat. No. 3,896,017, U.S. Pat. Nos. 3,963,663 and 4,036,800), it being possible for the epoxy resin component to be additionally modified with isocyanates. However, in some of these publications, it is pointed out that precondensation of the resol with the amine-containing component is possible, but should be avoided if possible, and furthermore, that it would be advantageous to dispense completely with phenolic resins (German Offenlegungsschrift No. 2,620,612, page 11, paragraph 1). The reason for this warning is not stated, but it is obvious: the phenolic resins described in the publications cited only crosslink slowly and, on crosslinking, split off formaldehyde and phenol. In order not to make this curing even more difficult, it is recommended, if phenolic resins are to be used at all, to dispense with too extensive an etherification of the methylol groups and to limit this to about 30%. However, for good compatibility with the other components of the varnish, a higher degree of etherification would be necessary.

In cataphoretic coating, the deposited coating films are rinsed with water before baking. During this, unreacted phenol and low molecular-weight resin constituents go into the rinsing water and cause problems with the waste water, which signifies a further serious disadvantage of the processes mentioned. Catalytic combustion of these waste waters is made difficult by the fact that the phenolic constituents oxidatively crosslink on the surface of the catalyst and make the combustion catalyst ineffective.

The same problem occurs in the decontamination of the waste gases being produced during curing. The waste air containing phenol makes the catalyst ineffective. Furthermore, the preparation of Mannich bases from phenols, aldehydes, primary and/or secondary amines, and the reaction of these with epoxy compounds has been disclosed in the German Auslegeschrift Nos. 2,320,301, 2,357,075, German Offenlegungsschrift Nos. 2,419,179, 2,711,385, 2,755,908 and 2,828,728. A characteristic of this process is the very high amine content in the final products. Mannich bases tend to hydrolyze. This leads to extensive changes on storage and on using the aqueous resin solutions. In addition, the crosslinking process is associated with splitting off amine and formaldehyde. Considerable odiferous pollution is produced. This adverse effect is said, in German Offenlegungsschrift No. 2,711,385, to be alleviated by using particular amines. However, complete prevention of the odiferous pollution is not possible by this means.

It has now been found, surprisingly, that the disadvantages specified can be prevented and that binders for cataphoretic coating are obtained, which binders crosslink rapidly, contain neither free phenol nor free formaldehyde and deposit these materials on processing either not at all or, at the most, in traces, and which, in addition, have outstanding properties in respect of elasticity, pigment-wetting, electrical properties, throwing power, corrosion resistance and processability, when co-condensates of epoxy resins and resols, before, during or after the co-condensation, are reacted with amines, which contain at least one primary or secondary amino group and at most 2 hydroxyl groups, and are dissolved in water, if appropriate, after the addition of acids, when, as the resol, the methylol compounds of oligomethylidenephenols (also called oligophenols in the following text) are used, the latter preferably being additionally substituted by hydrocarbon radicals of an aliphatic and/or aromatic nature or hydroxyalkyl or hydroxyaralkyl radicals, the term aliphatic also including cycloaliphatic groups.

Thus the invention relates to a binder and a process for its preparation, as defined in the Claims. Furthermore, the invention relates to a process defined in the Claims for the electrophoretic deposition of a cationic resin and an electrophoresis bath for carrying out this process.

The defunctionalized epoxy resins which can be used are those having a molecular weight of from 500 to 5,000, preferably 800 to 3,000 and derived from diphenylolpropane and/or diphenylolmethane and epihalogenhydrins. The defunctionalization may be effected particularly by monocarboxylic acids, monohydric phenols and/or monoepoxide compounds so that the resins still contain per molecular unit an average of 0.5 to 1.3, preferably 0.8–1.1 epoxide groups. Partially defunctionalized epoxy resins of this type can be prepared by reacting bifunctional epoxy resins, during their preparation or subsequently, with the said defunctionalizing components. However, it is particularly advantageous, for the preparation of the defunctionalized epoxy resins, to start from the technical diglycidyl ethers of diphenylolpropane and/or diphenylolmethane and to react these with bifunctional phenols, such as diphenylolpropane and/or diphenylolmethane and/or dicarboxylic acids having 4 to 10 carbon atoms, for example those mentioned below, in the presence of the defunctionalizing reactant. In this manner, the distribution of the epoxide groups becomes more regular. All these reactions can be carried out in the melt or in solution at temperatures from 60–300, preferably from 80–180, °C. and preferably in the presence of catalysts. The concomitant use of catalysts is particularly recommended when the reaction is to be carried out at low temperatures. Examples of suitable dicarboxylic acids are maleic, fumaric, phthalic, isophthalic, succinic, adipic, suberic or sebacic acid.

The monocarboxylic acids used are generally carboxylic acids having 1–24, preferably carbon atoms of synthetic or natural origin. Examples which may be mentioned are benzoic acid, isooctanoic acid, isononanoic acid, branched fatty acids, in which the alkyl radical is branched in the α-position and has 7 to 15, preferably 8 to 10, carbon atoms (Versatic acids) and the saturated or unsaturated acids derived from natural fatty oils, such as soybean acid, linseed oil fatty acid, ricinoleic acid, ricinenic acid, and tall oil fatty acid or colophonium.

Examples of phenols which can be used are phenol, the various cresols and xylenols, and phenols substituted by hydrocarbon groups, such as alkylphenols having 2 to 20, preferably 4-16, C atoms in the alkyl radical. Alkenylphenols can also be used. Phenol itself, tert.butylphenol, phenylphenol, cyclohexylphenol, isooctylphenol, isononylphenol, dodecylphenol or cashew oil are particularly suitable, the substituents in each case also including the isomers and being preferably in the p-position.

Examples of monoepoxides which may be mentioned are ethylene-, propylene-, butylene- and styrene-oxide, glycidol and its derivatives, such as its esters of monocarboxylic acids, e.g. of acrylic and methacrylic acid, versatic acid and its monoethers of alkanols and phenols, e.g. phenylglycidyl ether.

Examples of suitable catalysts are amines and phosphines, particularly the tertiary alkyl and aryl compounds. In general, they are added in amounts of 0.005 to 0.1% by weight. Apart from triphenylphosphine, particularly suitable catalysts are those tert.amines, which are not volatile under the reaction conditions.

If the defunctionalized epoxy resins are prepared from the diglycidyl ethers of diphenylolpropane or diphenylolmethane and bifunctional phenols and/or dicarboxylic acids, a further modification can be made by additionally using, under the abovementioned conditions, monoglycidyl compounds, for example phenyl glycidyl ether, glycidol, ethylene oxide, propylene oxide, styrene oxide or glycidyl esters of carboxylic acids, for example the glycidyl esters of Versatic acid.

Suitable phenolic resins for the preparation of the precondensates according to the invention are methylol compounds of oligomethylenephenols. The phenol component is preferably substituted with alkyl (including cycloalkyl), alkenyl, aryl, aralkyl or hydroxyalkyl or hydroxyaralkyl groups. The substituents not containing hydroxyl groups are on the nucleus and the hydroxyalkyl or aralkyl groups are on the phenolic hydroxyl group. The degree of substitution of all the substituents should total 5-100, preferably 10-90, equivalent %, relative to phenolic hydroxyl groups. It is also possible to use those phenolic components which are substituted both on the nucleus and on the phenolic hydroxyl group. The substituents can be present from the outset or can be subsequently introduced in a customary manner, in particular when starting from phenol ($C_6H_5OH$).

The resols are advantageously prepared in several steps. In the first step, the phenol is condensed with formaldehyde to give an oligomethylenephenol. In general, the degree of condensation of this product is in the low to middle range, determined by a starting ratio between phenol and formaldehyde of 1:(0.1-0.7), preferably 1:(0.2-0.65). After the condensation, the unreacted phenol is removed by distillation.

In a preferred embodiment, substituted oligophenols are used. Examples of possible routes for their preparation are the following: the preformed oligophenol is reacted with the alkylating reagent in the presence of a Friedel-Craft's catalyst. This route is particularly recommended when the alkylating reagent reacts particularly easily, as is the case, for example, with vinyl aromatic compounds or terpenes. However, the substituted oligophenols can also be prepared by co-condensation of phenol, formaldehyde and substituted phenols. Examples of substituted phenols to be mentioned are the abovementioned alkylphenols, preferably those having 4-12 carbon atoms, also phenols modified with vinyl aromatic hydrocarbons, particularly with styrene. Alkenylphenols, such as allylphenol, butenylphenol or isoprenylphenol can also be used. Aralkyl radicals having 8 to 10 carbon atoms are preferred as substituents of the phenols. In place of the substituted phenols, their methylol compounds, particularly their dimethylol compounds, can also be employed. In calculating the above initial molar ratio, the reactive formaldehyde bonded as the methylol group must also be taken into account. After the condensation, the oligophenols are freed of unreacted phenols by distillation.

If the oligophenol is to be substituted on the phenolic hydroxyl group, the reaction can be carried out in a customary manner by etherification of the phenolic OH groups by the method of Williamson. In this method, halogenohydrins, such as ethylene chlorohydrin, propylene chlorohydrin, chloropropanol and the like act as alkylating reagents in the presence of condensing agents, such as alkali. However, the substitution to give hydroxyalkyl-containing compounds can also be carried out by a base- or acid-catalyzed reaction of the oligophenol with monoepoxides, such as ethylene oxide, propylene oxide, styrene oxide, glycidol, phenyl glycidyl ether and the like.

The oligophenols are then converted into their methylol compounds. In general, this is carried out by base-catalyzed reaction with formaldehyde. Examples of catalysts which can be used for this reaction are alkali metal and alkaline earth metal hydroxides or oxides. It is also possible to use salts—such as those of zinc, lead, calcium, magnesium or manganese—of organic acids or weak inorganic acids, such as boric acid or phosphoric acid. However, the use of an alkali metal hydroxide is preferred. In general, the catalyst is added to the molten oligophenol, the product is cooled down to 30-80, preferably 40-70 and the formaldehyde is either added as aqueous formaldehyde or as paraformaldehyde or as a mixture of the two, it being possible for water or solvents, such as aromatic hydrocarbons or alcohols, to be added before, during and/or after the reaction with formaldehyde. Etherification of the methylol groups to any considerable extent is prevented by this reaction procedure.

The formation of the precondensate of epoxy resin and resol can advantageously be carried out in the melt or in solution, if appropriate with separation out of the water of condensation at temperatures from 80°-160° C., preferably from 100°-130° C. The relatively high reaction temperatures are made possible by the great stability of the methylol groups present on the oligophenol. The precondensation generally takes 0.5-10 hours and is monitored by measuring the melting point and/or the viscosity. No measurable degradation of the epoxide groups occurs during the precondensation. In general, the ratio of weights of epoxy resin and resol is between 20:80 and 80:20.

The addition of the amine to the epoxide groups can be carried out before, during or after the precondensation, advantageously at 20°-140° C., preferably 50°-120° C., advantageously in solvents. Depending on requirements, these can remain in the reaction product or can be partially or completely removed, for example, by distillation, before or after the addition of the water necessary for later use. When the precondensates are to be dissolved in organic solvents before dilution with water, it is advantageous originally to select these solvents. Examples of suitable solvents are alcohols having up to 6 C atoms, particularly the various butanols, amyl alcohols, hexyl alcohols and the like, esters, such as ethyl acetate, butyl acetate, ketones, such as methyl ethyl ketone, dipropyl ketone, cyclohexanone, methyl isobutyl ketone, methyl isoamyl ketone and the like. Even higher ketones, for example isophorone, or ketones containing hydroxyl groups, for example diacetone alcohol or 4-hydroxy-2-butanone, can also be used. When primary amines are used alone, or with others, as the amine component, it is advantageous to work partly or completely in ketonic solvents.

The addition of the amine to the epoxide group is usually complete after several hours when temperatures from 60°–120° C. are selected. The molar ratio of the epoxide groups to the amines is generally 1:0.1 to 1:1. Preferably, 0.35 to 0.9 mole of amine is employed for each epoxide group. Suitable amines are secondary or primary amines which carry alkyl and/or alkanol radicals as substituents, for example, ethylethanolamine, ethylisopropanolamine, diethanolamine, dipropanolamine, their lower alkyl ethers, preferably methyl and/or ethyl ethers of these alkanolamines and dialkylamines having alkyl radicals of one to three carbon atoms, such as dimethylamine, diethylamine and dipropylamine. Examples of primary amines which can be employed are: ethanolamine, propanolamine, dihydroxypropylamine, methylamine, ethylamine or propylamine. The use of primary and secondary aliphatic amines, which contain more than one amine function per molecule, it being necessary for at least one amine function to be primary or secondary, is preferred. Examples which may be used are diethylenetriamine, or triethylenetetramine or dialkylaminoalkylamines, such as dimethylaminopropylamine. The amines can be used alone or mixed with others. Finally, it is also possible to use polyamidoamines, which are produced in the reaction of dicarboxylic acids with polyalkyleneamines, as the amine component.

The amine-containing precondensates thus obtained cannot yet be diluted with water; on the contrary, they must first be protonized with an acid. In principle, all acids, which can be diluted with water, are suitable, but the use of carboxylic acids having 1–6 C atoms, such as formic acid, acetic acid, propionic acid, lactic acid or gluconic acid, or of phosphoric acid, is preferred. These acids can also be partly or completely present even during the formation of the adduct between precondensate and amine. The equivalent ratio of amine groups to acids is generally 1:0.2 to 1:2, preferably 1:0.5 to 1:1.5. However, in this respect, account should be taken of the fact that, on using amines with widely differing amine functionalities, for example on using diethylenetriamine or dimethylaminopropylamine, a part of the amine functionality is lost by incorporating the epoxy resin, since the basicity is greatly reduced by the substitution of the nitrogen with the epoxy resin, while the nitrogen which has not reacted with the epoxy resin retains its originally high basicity.

The precondensates to which acid has been added can be diluted with water. The pH which results depends on the type of the amine used, on its amount and on the degree of neutralization. In general, it is between 3.0 and 9.0. On using amines such as diethylenetriamine, triethylenetetramine or dimethylaminopropylamine or polyaminoamides, the pH is mostly between 6 and 9.

The MEQ value is important for the assessment of resins which can be deposited by cataphoresis. This expresses the mEq of acid per 100 g of solid resin which is used to convert into an aqueous colloidal solution. For the resins according to the invention, it is usually between 10 and 80, preferably between 15 and 45 MEQ.

The binders according to the invention can be pigmented and/or provided with fillers. However, it is also possible to prepare pigment pastes with third substances, for example, resins, and to add these to the resin solutions before use. It is not necessary for this purpose that resins of this type are themselves soluble in water. Due to the high solubilizing power of the precondensates, these resins are also converted into an aqueous solution.

In order to produce particular effects, and also for decreasing the MEQ value further, it is possible to add water-soluble and water-insoluble synthetic or natural resins or customary plasticizers to the resins; for example epoxy resins, particularly low molecularweight epoxy resins, their esters with fatty acids, alkyd resins, melamine resins or plasticizers, such as triphenyl phosphate, dialkyl phthalates or alcohols having 8 to 20 carbon atoms, can be used, in general in amounts of 2–40, preferably of 5–30% relative to the weight of the resin binder. The main use of the resins according to the invention is in the area of cataphoretic coating. Depending on the type of amine incorporated and the anion used for neutralization, the temperatures necessary for thermal curing are, in general, 110°–400°, preferably 140°–380° C. The relevant times are between 60 min. and a few seconds. During crosslinking, pollutants are either not split off at all or, at the most, in traces. Phenol is not produced in this process. On rinsing the cataphoretically coated plates, the rinsing water does not contain any free phenol.

The claimed resins can, however, also be applied by other processes, for example by rolling or spray coating, which can optionally be carried out by the so-called airless method, onto the substrates to be protected. This can be carried out in the form of the solutions diluted with water, or in organic solvents. In addition, the precondensates according to the invention can be used for a number of purposes other than for coating purposes, for example as adhesion promoters for inorganic materials, such as glass fibers, asbestos and the like, as fiber sizers, impregnating agents and binders for abrasive grains for the manufacture of abrasives on flexible backings or of abrasive tools or the like.

In the examples below, P=parts by weight and %=percent by weight. Unless otherwise stated, the viscosity of the resins was found in 50% strength solution in ethylene glycol monoethyl ether at 20° C. in each case. Melting points were determined by the capillary method.

EXAMPLE (a) Preparation of the resol

700 P of phenol, 4 P of maleic anhydride and 322 P of 30% strength aqueous formaldehyde solution were boiled under reflux for 3 hours in a reaction vessel provided with a thermometer, stirrer, reflux condenser, descending condenser and a device for adjusting a reduced pressure. The pressure was then decreased and the volatile constituents were distilled off until the bottom temperature was 220° C. There remained in the reaction vessel 499 P of an oligophenol having a viscosity of 290 mPa.s/20° C. The content of free phenol was less than 0.01%. 336 P of the oligophenol obtained were melted and 1 P of concentrated sulfuric acid was added. 172 P of styrene were added to the melt maintained at 80° C., the temperature was allowed to rise to 120° C. and this temperature was maintained for 1 hour. Thereafter, 184 P of 33% strength sodium hydroxide solution and 149 P of water were added, the mixture was cooled down to 60° C. and 188 P of a 37% strength aqueous formaldehyde solution were added. After 3.5 hours, free formaldehyde was no longer detectable. The melt was then diluted with 367 P of isobutanol and 41 P of xylene and neutralized with 161 P of 50% strength sulfuric acid. After separating off the aqueous phase, water was removed by recirculating distillation under reduced pressure and 960 P of a 60% strength resin solution, having a viscosity of 1,150 mPa.s/20° C. (60% strength), were obtained.

(b) Preparation of the epoxy resin 167.2 P of epoxy resin, having an epoxide equivalent weight of 190 based on bisphenol A and epichlorohydrin, 54.6 P of bisphenol A and 18.8 P of phenol were melted in an apparatus as mentioned under (a) and, at 100° C., 0.08 P of dimethylaminopropylamine was added. The mixture was then heated to 140° C. and this temperature was maintained for 6 hours. 240 P of an epoxy resin having an epoxide number of 1.3, a melting point of 61° C. and a viscosity of 430 mPa.s/20° C. were obtained in quantitative yield.

(c) Preparation of the precondensate of epoxy resin and resol 226.6 P of the 60% strength resol solution prepared under (a) were added to the melt of epoxy resin contained in the reaction vessel. During this, the mixture cooled down to 100° C. The pressure was reduced and the solvent was removed. During this, the temperature rose to 118° C. The temperature was maintained at 118° C. for 2½ hours; the melting point of the precondensate was then 55° C. and the epoxide number was 0.78. Then 226 P of cyclohexanone were added and the contents of the reaction vessel were brought to 80° C.

(d) Preparation of the amine adduct 20.3 P of dimethylaminopropylamine were allowed to run into the solution at 80° C. and this temperature was maintained for 3 hours. The viscosity of the solution, at a residue of 60% (1 hour at 170° C.), was 9,500 mPa.s/20° C. Then 26.8 P of a 50% strength solution of lactic acid were added to the solution.

(e) Preparation of the aqueous solution

800 P of deionized water were added, with stirring, to 200 P of the resin solution obtained under (d) in an open dilution vessel. An aqueous colloidal solution, having a resin content of 12%, was formed. The pH of the solution was 7.2.

(f) Cataphoretic deposition

A degreased steel plate, as anode, and a phosphatized steel plate, as the cathode, were introduced into a cataphoresis cell. The cataphoretic coating was carried out at a voltage of 220 volt and it lasted 1.5 min. During this time, the current decreased from an initial 3 A to 50 mA. The plate connected as the cathode was removed from the cell and rinsed with water. No phenol was detectable in the rinsing water. After drying the plate with a stream of air, the coating was baked in an oven heated by circulating air at 170° C. for 20 min. A hard glossy coating of high elastic strength, having a layer thickness of 24 μm on both sides, was formed. The baked coating film was resistant to organic solvents and passed the acetone test.

We claim:
1. A binder comprising a co-condensate
   (a) a partially defunctionalized epoxy resin which still contains, on average, 0.5 to 1.3 epoxy groups per molecular unit and has a molecular weight of from 500 to 5,000,
   (b) a resol comprising methylol compounds of oligomethylenephenols which are unsubstituted or substituted by hydrocarbon or hydroxyalkyl or hydroxyaralkyl groups and
   (c) an amine containing at least one primary or secondary amino group, a substituent selected from the group consisting of alkyl substituents, alkanol substituents and both, and at most two hydroxyl groups, the weight ratio of epoxy resin to resol being between 20:80 and 80:20 and the molar ratio of epoxide groups to amines being in the range of from 1:0.1 to 1:1.

2. A binder as claimed in claim 1, wherein the epoxy resin has been defunctionalized by means of monocarboxylic acids, monohydric phenols or monoepoxide compounds or a combination thereof, is derived from diphenylolpropane, diphenylolmethane, or both, and epihalogenohydrins and still contains 0.8 to 1.1 epoxide groups per molecular unit.

3. A binder as claimed in claim 1, wherein the defunctionalized epoxy resin has additionally also been modified by reaction with diphenylolmethane, diphenylolpropane, dicarboxylic acids having 4 to 10 carbon atoms, or a combination thereof, at 80°–180° C. and in the presence of catalysts.

4. A binder as claimed in claim 1, wherein the epoxy resin has a molecular weight of from 800 to 3,000.

5. A binder as claimed in claim 1, wherein the degree of substitution of all substituents of the resol component is 5 to 100 equivalent %, and the hydrocarbon substituents are alkyl groups having 4 to 16 carbon atoms, aralkyl groups having 8 to 10 carbon atoms or a combination thereof.

6. A binder as claimed in claim 1, wherein the amine contains more than one amine function in the molecule and is used in an amount such that the molar ratio of epoxide groups to amines is 1:0.35 to 1:0.9.

7. A binder as claimed in claim 1, which is present in an aqueous form protonized by acid, the equivalent ratio of amine groups to acids generally being 1:(0.2 to 2).

8. A process for the manufacture of a binder which comprises co-condensing at a temperature in the range from 80° to 160° C.
   (a) an epoxy resin which is partially defunctionalized and contains, on average, 0.5 to 1.3 epoxy groups per molecular unit and has a molecular weight of from 500 to 5,000, with
   (b) a resol comprising methylol compounds of oligomethylenephenols which are unsubstituted or substituted by hydrocarbon or hydroxyalkyl or hydroxyaralkyl groups and
   (c) before, during or after this co-condensation at a temperature in the range from 20° to 140° C. with an amine containing at least one primary or secondary amine group, a substituent selected from the group consisting of alkyl substituents, alkanol substituents and both, and at most two hydroxy groups, distilling off the volatile constituents and isolating this product or converting it into an aqueous-colloid phase by water and acid.

9. A process as claimed in claim 8, wherein the reaction of the epoxy resin with the resol is carried out at 80° to 160° C. and the amine is added at 20°–140° C.

10. A process as claimed in claim 8, wherein the resol has been prepared in more than one step in such a manner that initially an oligophenol is prepared, using phenol, by reaction with formaldehyde in the initial ratio of 1:(0.1–0.7), unreacted phenols are removed by distillation and the oligophenols are then converted into the methylol compounds in a customary manner.

11. A process as claimed in claim 8, wherein the co-condensation is carried out at a temperature of from 100° to 130° C.

12. An aqueous electrophoresis bath for carrying out an electrophoretic deposition of a cationic resin from an aqueous dispersion onto an article connected as the cathode, which contains a binder as claimed in claim 1, the pH being between 3.0 and 9.0.

13. A binder as claimed in claim 1 comprising a co-condensate of (a) a partially defunctionalized epoxy resin which still contains, on average, 0.5 to 1.3 epoxide groups per molecular unit, has a molecular weight of from 500 to 5,000, has been defunctionalized by means of monocarboxylic acids, monohydric phenols or monoepoxide compounds or a combination thereof and is derived from diphenylolpropane, diphenylolmethane, or both, and epihalogenohydrins, (b) a resol comprising methylol compounds of oligomethylenephenols which have a degree of substitution by hydrocarbon groups in the range from 5 to 100 equivalent %, the hydrocarbon substituents being alkyl groups having 4 to 16 carbon atoms, aralkyl groups having 8 to 10 carbon atoms or a combination thereof, (c) an amine containing more than one amino function, at least one of which being a primary or secondary amino group, a substituent selected from the group consisting of alkyl substituents, alkanol substituents and both, and containing at most two hydroxyl groups the weight ratio of epoxy resin to resol being between 20:80 and 80:20, the amine being used in an amount such that the molar ratio of epoxide groups to amines is 1:0.1 to 1:1 and the binder being present in an aqueous form protonized by acid, the equivalent ratio of amine groups to acids generally being 1:(0.2 to 2).

* * * * *